(12) United States Patent
Davidson et al.

(10) Patent No.: US 6,670,579 B2
(45) Date of Patent: Dec. 30, 2003

(54) WELDING-TYPE SYSTEM WITH NETWORK AND MULTIPLE LEVEL MESSAGING BETWEEN COMPONENTS

(75) Inventors: Robert R. Davidson, New London, WI (US); Todd Holverson, Appleton, WI (US); L. Thomas Hayes, Oshkosh, WI (US); James Rappl, Neenah, WI (US); James Uecker, Appleton, WI (US); James Olejnizak, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 74 days.

(21) Appl. No.: 09/957,707

(22) Filed: Sep. 19, 2001

(65) Prior Publication Data

US 2003/0062351 A1 Apr. 3, 2003

(51) Int. Cl.$^7$ .................................................. B23K 9/10
(52) U.S. Cl. .................................. 219/130.5; 219/125.1
(58) Field of Search ....................... 219/130.5, 130.01, 219/136, 125.5; 700/117, 264; 705/26

(56) References Cited

U.S. PATENT DOCUMENTS

| 6,115,273 | A | | 9/2000 | Geissler | |
| 6,479,792 | B1 | * | 11/2002 | Beiermann et al. | 219/130.5 |
| 6,486,439 | B1 | * | 11/2002 | Spear et al. | 219/136 |
| 2002/0045970 | A1 | * | 4/2002 | Krause et al. | 700/264 |

FOREIGN PATENT DOCUMENTS

WO    WO01/32347 A1    5/2001

OTHER PUBLICATIONS

"DeviceNet Technical Overview", 2001, pp. X through XXVI, from Open DeviceNet Vendor Association, Inc.*
ALT 304 Miller® The Power of Blue Oct. 2000.
Maxstar® 200 SD, DX, and LX, Miller® The Power of Blue Dec. 2000.

* cited by examiner

Primary Examiner—Clifford C. Shaw
(74) Attorney, Agent, or Firm—George R. Corrigan

(57) ABSTRACT

A method and apparatus for providing welding-type power including a source of welding-type power connected to a controller is disclosed. The controller includes a controller network module with a controller multiple level message module. A welding-type device includes a device network module with a device multiple level message module. A network is operatively connected to the network modules, and is capable of sending a plurality of multiple level messages. A welding peripheral and/or a second source of power has a network module with a multiple level module and is connected to the network. The multiple level message includes an identifier portion and a data portion, and the data portion can include a pointer portion and a value portion in various alternatives. The components may have memory connected to the multiple level message modules, and store common message decoding data therein so that they have shared knowledge for decoding the pointer portions and data portions. The common data can be the same in all devices.

42 Claims, 2 Drawing Sheets

WELDING-TYPE SYSTEM WITH NETWORK AND MULTIPLE LEVEL MESSAGING BETWEEN COMPONENTS

FIELD OF THE INVENTION

The present invention relates generally to the art of welding-type power supplies. More specifically, it relates to welding-type power supplies and the communication between various devices in such systems.

BACKGROUND OF THE INVENTION

Welding power supplies or systems are available for a wide variety of processes, and with a wide variety of sophistication. Welding-type power supply or system, as used herein, includes power supplies or systems that provide welding, cutting or heating power, and may include a controller, switches, etc. Traditionally, a good weld required an experienced welder, not only to properly execute the weld, but to properly select operating parameters (such as output voltage, current, power, pulse width, wire feed speed, etc.).

Now, robots are available that execute the weld. Also, orating parameters may be pre-determined and automatically implemented by a controller in the welding-type power supply. The automation is typically a software program that describes the output waveform, and is executed by a digital processor (microprocessors, DSPS, etc.). The program attempts to implement and improve upon the decisions that had been made by the experienced welder. The various welding-type devices in the weld cell must be able to communicate to effectively carry out the programs. Welding-type device, as used herein, includes welding peripherals, and/or welding-type power supplies and sources of welding-type power.

With the increasing sophistication of welding-type power supplies, and the programs they implement, the need for communication between the various devices in a welding-type power supply increases, and the communications must also become increasingly sophisticated.

Traditionally, the communication between devices in a welding-type system or a weld cell was a dedicated link between two devices, wherein data and/or commands were provided on the direct connection.

Networks, to the extent they have been used, have relied upon messages that contained the instructions, commands, and/or data directly. A part of each message was dedicated to refer to a specific command or parameter. Each new command or parameter for a device required the message to be long enough to provide bits dedicated to that new command. Adding a new device to the network could require many new commands, and the concomitantly longer message.

For example, a 16 bit command might have the first 4 bits identify the node to which the communication is intended. The next four bits might set one parameter, such as the current command, the next four bits relate to the wire feed speed, and the last four bits relate to a voltage command. Adding a parameter, such as a pulse width, could require an additional four bits to be added to the message length. One can readily see how increasingly complex messages quickly become ever longer.

Unfortunately, longer messages can bog a system down, make programming a system unwieldy, and upgrading a system difficult. Conversely, sending less information reduces the flexibility, control, and usefulness of a welding-type power supply, Also, networks developed solely for welding-type power supplies cannot readily take advantage of commercially available network protocols and hardware by using them in a typical fashion. Having each message firmly defined and assigned an explicit address requires knowledge of the network protocol to make changes. As a system for welding evolves and is improved the network messaging scheme would require cumbersome updating and changing.

Accordingly, a welding-type power supply that provides for efficient and economical communication is desirable. Such a system will preferably be able to transmit complex and varied messages. Also, it will preferably be suitable for using with commercially available hardware or software, to allow easier designing, adding on to, and upgrading.

SUMMARY OF THE PRESENT INVENTION

According to a first aspect of the invention, a welding-type system includes a source of welding-type power operatively connected to a controller. The source of welding-type power includes a power network module with a power multiple level message module, and the controller includes a controller network module with a controller multiple level message module. A network is operatively connected to the network modules, and is capable of sending a plurality of multiple level messages.

According to a second aspect of the invention a method of providing welding-type power, includes connecting a source of welding-type power to a network, and connecting a controller to the source of welding-type power. The controller is-also connected to the network. Multiple level messages are sent between the source of power and the controller.

The network is DEVICENET™ compatible in one embodiment.

A welding peripheral and/or a second source of power has a network module with a multiple level module and is connected to the network in another embodiment.

The multiple level message includes an identifier portion and a data portion, and the data portion can include pointer portion and a value portion in various alternatives.

The controller and sources of power and peripheral have memory connected to the multiple level message modules, and store common message decoding data therein so that they have shared knowledge for decoding the pointer portions and data portions. The common data can be, but need not be, the same in all devices.

According to a third aspect of the invention a method of providing welding-type power includes connecting a source of welding-type power to a network and a controller. The controller is also connected to the network. A first set of message decoding data is stored in the controller, and at least a first subset of the first set of message decoding data is stored in the source of power. Thus, the controller and the first source have shared knowledge for responding to a pointer portion and a data portion of a plurality of messages. The messages may or may not be multiple level messages.

According to a fourth aspect of the invention a welding-type power supply includes a source of welding-type power and a controller operatively connected to the source. A network is connected to the controller and the source. The controller includes memory that has a first set of message decoding data stored therein. The source includes memory that has at least a first subset of the first set of message decoding data stored therein. Thus, the controller and the first source have shared knowledge for responding to a pointer portion and a data portion of a plurality of messages.

According to a fifth aspect of the invention a method of communicating between devices in a weld cell includes connecting a first device to a network and connecting a second device to the network. Multiple level messages are sent between the first and second devices.

According to a sixth aspect of the invention a method of communicating between devices in a weld cell includes connecting a first device to a network and connecting a second device to the network. A first set of message decoding data is stored in the first device and at least a first subset of the first set of message decoding data is stored in the second device. Thus, the first and second devices have shared knowledge for responding to a pointer portion and a data portion of a plurality of messages.

According to a seventh aspect of the invention a system for communicating between devices in a weld cell includes a first device with a first network module and a first multiple level message module. Also, second device has a second network module and a second multiple level message module. A network is operatively connected to them, and is capable of transmitting a plurality of multiple level messages.

According to an eighth aspect of the invention a system for communicating between devices in a welding-type power supply includes a first device, a second device and a network connecting them. The devices have memory with common message decoding data stored therein so that they have shared knowledge for responding to a pointer portion and a data portion of a plurality of messages.

Other principal features and advantages of the invention will become apparent to those skilled in the art upon review of the following drawings, the detailed description and the appended claims.

Figure 1:
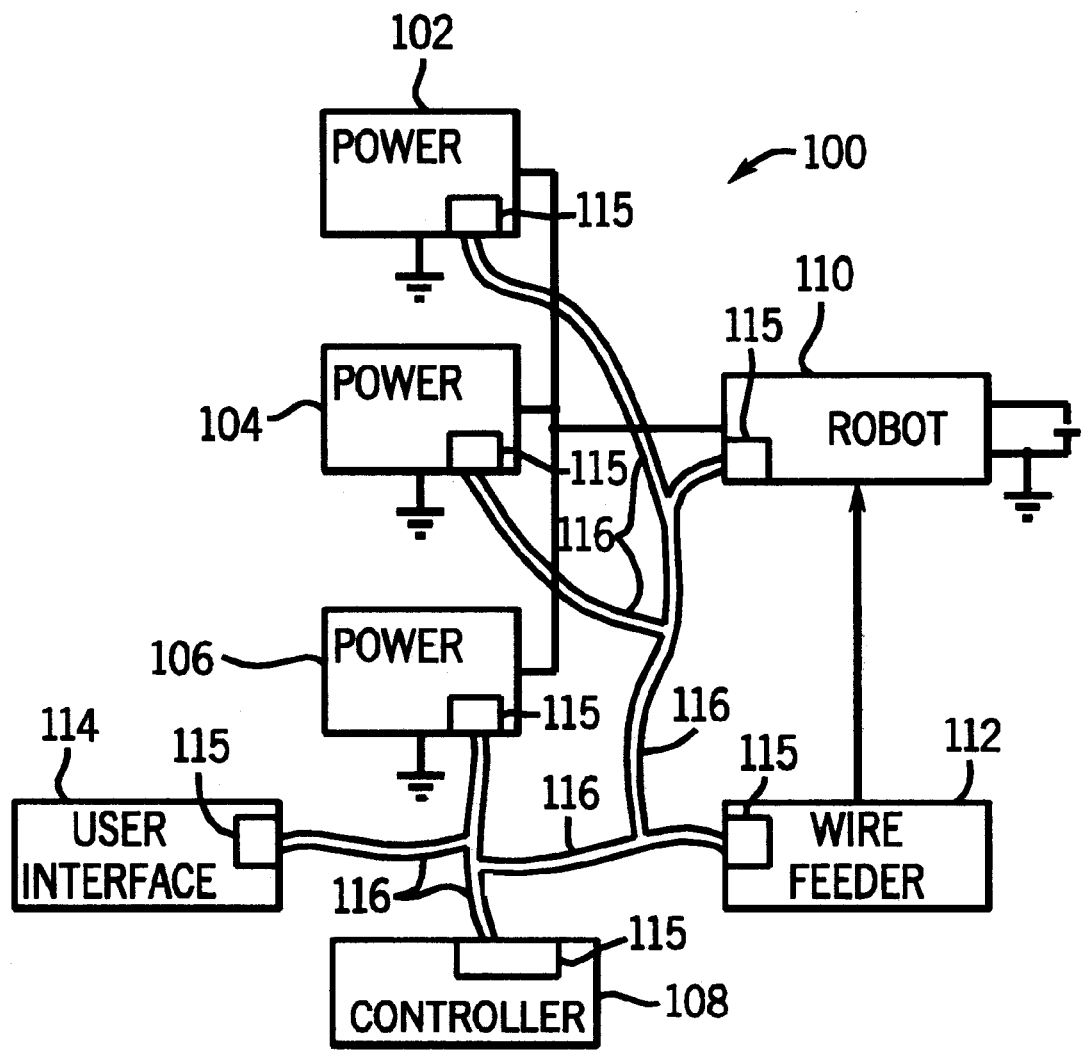
FIG. 1 is a diagram of a welding-type system in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to particular components in a particular system and a particular application it should be understood at the outset that the invention could be implemented with other components and systems and used in other applications.

Generally, the invention relates to a welding-type power supply or welding-type system that includes multiple modules or devices in a weld cell such as a power source, peripherals such as a wire feeder and/or robot, a controller, a user interface, and communication between those modules.

Welding-type power supply or system, as used herein, includes power supplies that provide welding, plasma or heating power, and may include a controller, switches, etc. Devices in a weld cell, as used herein, includes power sources, power supplies, robots, wire feeders, controllers, or other welding peripherals. Module, as used herein, includes software and/or hardware that cooperates to perform one or more tasks, and can include digital commands, power circuitry, networking hardware, etc. Weld cell, as used herein, includes a welding system, and any peripherals associated therewith. Welding peripheral, as used herein, includes robots, wire feeder, user interface, gas supplies, or any other devices used with a welding power supply. Welding-type power, as used herein, refers to welding, plasma or heating power.

A network connects the devices, and the network is preferably compatible with commercially available networks, such as DEVICENET™, particularly ODVA DEVICENET™. DEVICENET™ compatible, as used herein, includes a network that uses DEVICENET™ protocols and physical systems. Connected, as used herein, includes physical connections such as wires and through components, and operatively connected, such as software. Alternatives provide for other network connection, such as ethernet or a custom network, RS232, IRDA, wireless, etc., rather than DEVICENET™.

Each device includes a network module to allow for communication between devices on the network. Network module, as used herein, includes a module that can connect to and communicate through a network.

The network modules include multiple level messaging modules that allow the devices to send and receive multiple level messages. Multiple level message module, as used herein, includes a module that can understand and send and/or receive a multiple level message. Multiple level messages, as used herein, includes a message that can be understood by using a part of the message to access a database that specifies to what another portion of the message relates.

Generally, each message includes an identifier portion (or address) which indicates which device(s) or node(s) on the network should respond to the message. The identifier portion can be standard addressing, such as that used in DEVICENET™. Identifier portion, as used herein, includes a portion of a message that identifies a device or module for which the message is intended, Two successive messages can be used, where the first identifies the node to receive the subsequent message, which contains the information to be sent. Message, as used herein, includes both the address and information, even if they are not sent in the same packet. Also, one alternative does not use an address—each node receives the message, and responds accordingly.

Each message also includes a data portion where parameters are identified and values for the parameter given. Data portion, as used herein, includes a portion of a message that includes pointer information and/or parameter data such as magnitudes, on/off commands, timing commands, etc.

For example, such a data portion might be 8 bytes long, and each byte is treated as integer pairs. DEVICENET™ uses the intel format and sends integers of most significant byte first, and the 8 bytes are sent (10325476), and within each byte the most significant bit is sent first.

The data portion preferably includes a value portion and a pointer portion. The value portion contains magnitude data, and the pointer portion specifies to what parameter the value relates. Pointer portion, as used herein, includes a portion of a message used to access a memory such as a database, array or list that defines what another portion of the message relates to. Value portion, as used herein, includes the portion of a multiple level message that includes parameter data such as magnitudes, on/off commands, timing commands, etc.

Continuing with the example above, integer 0 contains status flags, integer 1 (bytes 2&3) and integer 2 (bytes 4 and 5) are the value portion and contain parameter values (magnitudes, e.g.). Integer 3 includes bytes 6 and 7, and each byte is broken into 2 nibbles each. Each of these 4 nibbles are use to identify one of 16 different parameters of a highly used data set. Nibbles 1 and 2 identify the parameters for which the controller requests values be sent back in parameters 1 and 2 integers (requested data). Nibbles 3 and 4 identify the parameters for which values are sent in integers 1 and 2 in this message package.

Thus, it may be seen that data for up to 16 parameters (the number that can be specified using one nibble) can be provided (although not all in one message) yet the message length is not 16 integers long.

Each net-work module must be able to interpret the pointer so that it knows to what the data relates. Thus, each network module stores in memory information that explains the pointers, and is called message decoding data. For the message to be properly understood the sending and receiving network modules must have shared knowledge for decoding. Message decoding data, as used herein, includes instructions or information stored in the device where a message is received that allows the device to interpret, understand, and respond to the message. Shared knowledge for decoding, as used herein, includes having common data for understanding multiple level messages. Memory, as used herein, includes volatile and non-volatile memory, and can be arrays, databases, lists, etc.

The table below shows the 16 parameters that are specified in integer 3.

| Index | Name |
|---|---|
| 0 | Actual arc Current |
| 1 | Actual Arc Voltage |
| 2 | Actual Wire Feed Speed |
| 3 | Arc Length Command |
| 4 | Voltage Command |
| 5 | Wire Feed Speed Command |
| 6 | Induct./Sharp Arc Comm. |
| 7 | Actual Gas Flow Feedback |
| 8 | Undefined |
| 9 | Undefined |
| A | Undefined |
| B | Error Type |
| C | Teach Array Pointer |
| D | Taught Value pointed to by Teach Index) |
| E | Undefined |
| F | Undefined |

It is seen that the above system allows for 16 parameters. However, the inventors have devised a way to substantially increase the number of parameters that may be accessed—by using another level of messaging. As shown above in the table parameters C and D relate to "teach" parameters. The preferred embodiment contemplates using the additional level at least in part to "teach" a weld program to the control (from the user interface. However, these sub-level parameters could be used for any number of functions, and a more generic name is pointer or sub-level pointer, and sub-level value.

The extended or sub-level list is obtained by first sending the request to enter "Teach Mode". This action is done by a node (such as the user interface) sending out a message that asks for the TEACH MODE ON/OFF to be changed to ON. To do this "Teach Pointer=Teach Mode is sent in value 1 (bytes 2 and 3) and Teach Value=1 means in teach) is sent in value 2 (bytes 4 and 5).

The message would look like:

| | Low Byte | | High Byte | |
|---|---|---|---|---|
| Integer | High Nibble | Low Nibble | High Nibble | Low Nibble |
| 0 | xxxxxxxx | | Xxxxxxxx | |
| 1 | 0 | | 1 | |
| 2 | 0 | | 1 | |
| 3 | D | C | D | C |

The node (such as the user interface) waits for confirmation from the master before formally going into teach mode—such a confirmation message would look like:

| | Low Byte | | High Byte | |
|---|---|---|---|---|
| Integer | High Nibble | Low Nibble | High Nibble | Low Nibble |
| 0 | xxxxxxxx | | Xxxxxxxx | |
| 1 | 0 | | 1 | |
| 2 | 0 | | 1 | |
| 3 | xx | xx | D | C |

Having entered the teach mode, the system has access to many more parameters. The first value or data field is used to send a pointer and is two bytes in length. Thus, the list or array to which the pointer points can have up to 65536 entries. The second value field gives the magnitude or value of the parameter specified in the first value field. Of course, this requires the two nodes agree on the list of parameters (a simple array), and to understand the units of the value or magnitude sent. In other words, the nodes must have shared knowledge for decoding the message, and the memory can be considered message decoding data.

All nodes share the same knowledge in the preferred embodiment, although it would be easy for the master node (the controller in the preferred embodiment) to have separate lists for different nodes, and each other node to have a corresponding list.

The particular message or parameters accessed through the sub-level are not part of the invention. however, as an example, a partial list of possible sub-level parameters is given below:

| Index | Name | Units (meaning) |
|---|---|---|
| 1 | Teach Mode | On/Off (0 = off 1 = On = teach mode) |
| 2 | Taught point | typical = 1–15 |
| 3 | Phase (Background, Peak . . . ) | 0, 1, 2, 3 . . . |
| 4 | Wire Spd at Taught Point | IPM (100, 150, 200 . . . ) |
| 5 | Voltage at Peak | Tenths (215 = 21.5 |
| 6 | Ramp Value | A/ms (250 = 250 A/ms) |
| 7 | Curve | A/msec2 (expon.) |
| 8 | S Curve | 1 = on, 0 = off |
| 9 | Final Amperage | Amps (100 = 100A) |

-continued

| Index | Name | Units (meaning) |
|---|---|---|
| 10 | Time Duration | (msecs, secs, .1 msecs) |
| 11 | Short Detect Volt Threshold | Tenths of Volts |
| 12 | Arc Detect Voltage Threshold | Tenths of Volts |
| 13 | Wire Resistance | milohms |
| 15 | Voltage command for CV loop | Volts |
| 16 | Command for energy loop | Joules |
| 17 | Min Current command | Amps (100 = 100A) |
| 18 | Current at first contact | 1 = 1 Amp |
| 19 | Hold time START CURRENT | 1 = 1 msec |
| 20 | unused | |
| 31 | Index to sequencer types | |
| 32 | sequence name | Pre, postflow, crater . . . |
| 35 | Max motor speed | IPM |
| 36 | Min motor speed | IPM |
| 37 | Max reverse motor speed | IPM |
| 38 | Min reverse motor speed | IPM |
| 61 | Canned pulse peak amps | 1 = 1 Amp |
| 62 | Canned pulse background A | 1 = 1 Amp |
| 63 | Canned frequency | 1 = 1 period/sec |
| 64 | Canned pulse width | 1 = 1 msec |
| 65 | Canned pulse rise/fall time | 1 = 1 A/msec |
| 66 | Canned pulse ramp shape | Taught point |

Alternatives includes combining this method with the use of additional bytes to extend the size of the array thus to extend the number of variables. Other alternatives include having the index and data as part of the same message package or sending them as sequentially in separate messages. The data sent could be in a variety of forms, including a single bit, a nibble, a byte, a word, an array, or even a whole file. The index or pointer could be a bit, a nibble, a byte, a word, or more bytes or combination of bytes. Also, the index or pointer could address a sequentially built array or it could be designed to address a nested array system. For example, the first part of the address would define which master array to look into, a second part would define which slave array to look into, and a third part of the address could point to the particular piece of data within this last array. The nesting could go as deep as desired (which allows even more parameters to be specified). A different communication scheme could be used, by having an index into an array paired with a piece of data. A message packet could contain more than one pair of index/data pairs, and other information could go along with an index/data message. Other alternatives that take advantage of the multiple level message could be used, and this type of communication could be used in other fields.

Referring now to FIG. 1, a welding-type system 100, includes sources of welding-type power 102, 104 and 106, a controller 108, a robot 110, a wire feeder 112 and a user interface module 114. Each of the components includes a network module 115 that provides for multiple level messaging between the devices on a network 116.

The power sources are operatively connected to the robot, wire feeder and controller (and the user interface through the controller). The power connection to the robot may be through the wire feeder. Operatively connected, as used herein, includes a physical, wireless, or instructional connection that allows to components to cooperate.

Controller 108 is the master on the network, and provides instructions to the remaining devices. Controller 108 may share a housing with (and be part of) robot 110, it may share a housing with the sources of power, it may be distributed, or it may have a separate housing. Controller, as used herein, includes digital and analog, circuitry, discrete or integrated circuitry, microprocessors, DSPs, etc., and software, hardware and firmware, located on one or more boards, used to control a device such as a power supply.

Each source of welding-type power also has a controller that responds to the system controller. The sources of welding-type power are preferably one similar to that found in the Miller Alt304® or Miller MaxStar® welding systems, also described in U.S. patent application Ser. No. 09/540,567, filed Mar. 31, 2000, entitled Method And Apparatus For Receiving A Universal Input Voltage In A Welding, Plasma Or Heating Power Source, and one described in U.S. Pat. No. 6,115,273, entitled Power Converter With Low Loss Switching, issued Sep. 5, 2000, which is hereby incorporated by reference.

The power sources are arranged in parallel, to provide three times the power a single source would provide. Of course, fewer or more (or different) sources of welding-type power could be used. The power sources can be separately controlled, or two could be slaved to the third. Source of welding-type power, or welding-type power source, as used herein, includes any device capable of, when power is applied thereto, supplying welding, plasma cutting, and/or induction heating power including but not limited to inverters, converters, resonant power supplies, quasi-resonant power supplies, etc., as well as control circuitry and other ancillary circuitry associated therewith.

Messages are sent from controller 108 to power sources 102–106 on network 116. The messages include information such as setpoints, waveform shape, durations, etc., and are sent using multiple level as described above.

Also, information requested from the power sources (such as actual values) by the controller, is provided in messages sent from the power sources to the controller. The power sources may share a network module, and communicate between them extraneous to the network. Network 116 is likewise used for communication between any two devices on the network. Alternatives includes more or fewer devices on the network (for example a robot might not be provided).

Figure 2:
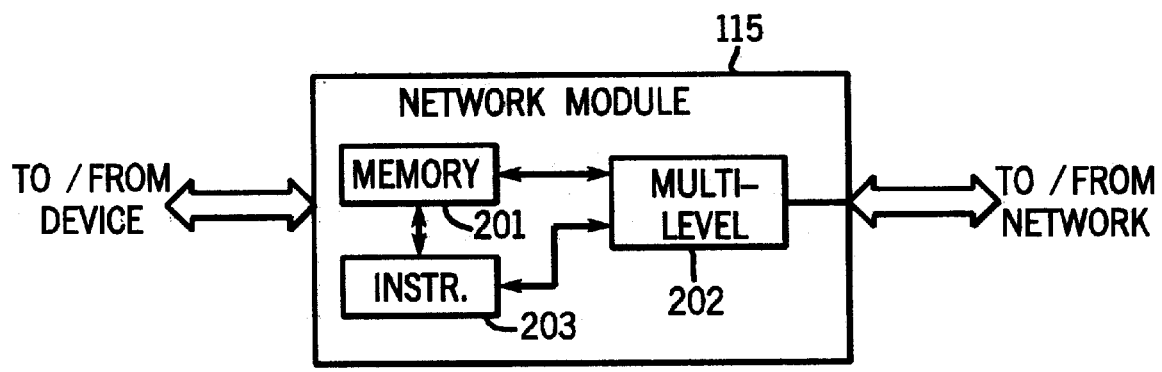
FIG. 2 is a diagram of a network module in accordance with the present invention.

Referring now to FIG. 2, a diagram representing network module 115 includes a memory 201, a multiple level message module 202, and an instruction module 203. These are implemented using digital circuitry, memory chip, microprocessors, and communication chips. Multiple level messaging module 202 receives data from network 116. Instruction module 203 uses the array stored in memory 201 to decode the message, and provides an appropriate output. Of course, memory 201 and instructions 203 may reside outside the network module—so long as the module has access to the memory to properly decode the message.

Thus, the communication system allows two devices to accurately communicate as long as they agree on at least a portion of a reference array. These arrays are independent of the communication methodology and can be changed easily.

Figure 3:
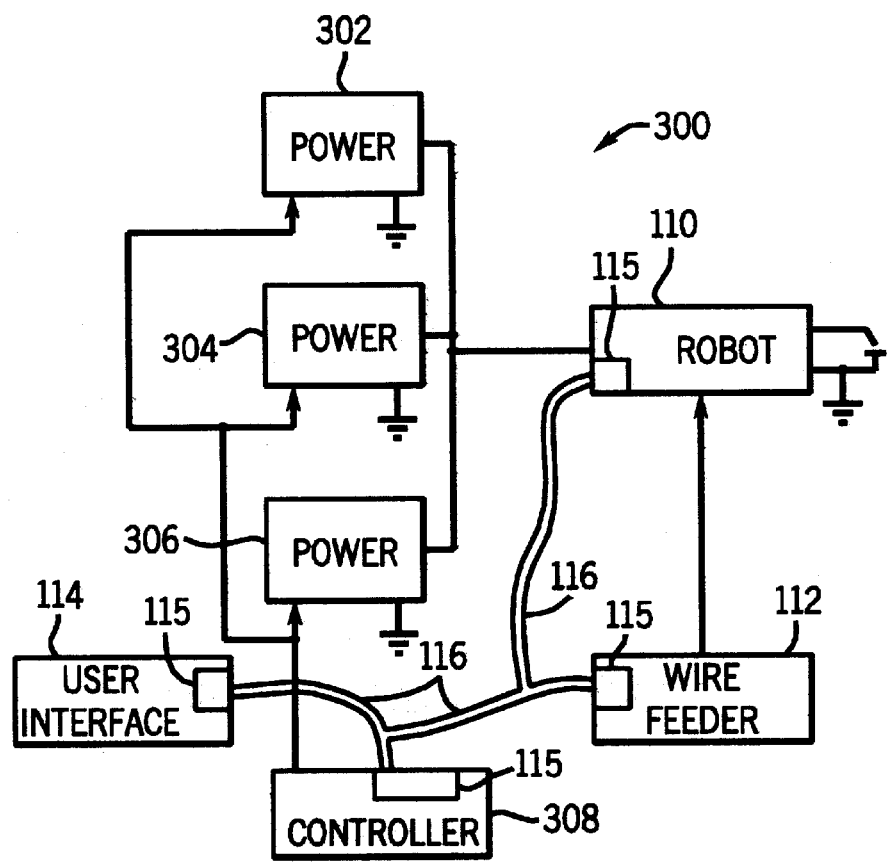
FIG. 3 is a diagram of a welding-type system in accordance with the present invention.

Referring now to FIG. 3, another embodiment includes welding-type system 300. Welding-type system 300 includes many of the components of welding-type system 100, but a plurality of power modules 302, 304 and 306 do not include network modules. Rather a single controller 308 provides the connection to the network, and the single controller provides control signals to the power source in a traditional manner.

Numerous modifications may be made to the present invention which still fall within the intended scope hereof. Thus, it should be apparent that there has been provided in accordance with the present invention a method and apparatus for a welding-type system and communications scheme that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding-type system, comprising:
   a source of welding-type power;
   a controller, operatively connected to the source of welding-type power,
      wherein the controller includes a controller network module with a controller multiple level message module;
   a welding-type device,
      wherein the welding-type device includes a device network module with a device multiple level message module; and
   a network, operatively connected to the source of device network module and the controller network module, and capable of sending a plurality of multiple level messages, wherein the multiple level message includes an identifier portion and a data portion and the data portion includes a pointer portion and a value portion.

2. The welding-type system of claim 1, wherein the network is DEVICENET™ compatible.

3. The welding-type system of claim 1, further comprising, a welding peripheral having a peripheral network module with a peripheral multiple level module, wherein the peripheral network module is connected to the network.

4. The welding-type system of claim 1, further comprising a second source of welding-type power operatively connected to the controller.

5. The welding-type system of claim 4, further comprising:
   a controller memory connected to the controller multiple level message having at least a first set of message decoding data stored therein;
   a device memory connected to the device multiple level message module having at least a first subset of the first set of message decoding data stored therein; and
   a peripheral memory connected to the peripheral level message module having at least a third subset of the first set of message decoding data stored therein;
   whereby the controller and the device have shared knowledge for decoding the pointer portions and data portions and the controller and the peripheral have shared knowledge for decoding the pointer portions and data portions.

6. The welding-type system of claim 5, wherein the first subset and the second subset are the same.

7. The welding-type system of claim 5, wherein the first subset and the second subset are not the same.

8. A method of providing welding-type power, comprising:
   connecting a source of welding-type power to a controller;
   connecting the controller to the network;
   connecting a welding-type device to the network; and
   sending multiple level messages, having a data portion with a pointer portion and a value portion, to the device from the controller.

9. The method of claim 8, further comprising, sending multiple level messages to the controller from the device.

10. The method of claim 9, connecting includes connecting to a network that is DEVICENET™ compatible.

11. The method of claim 9, further comprising:
    connecting a welding peripheral to the network; and
    sending multiple level messages to the peripheral power from the controller.

12. The method of claim 8, further comprises connecting a second source of welding-type power in parallel with the source.

13. The method of claim 12, further comprising:
    storing a first set of message decoding data in the controller;
    storing at least a second subset of the first set of message decoding data in the device; and
    storing at least a third subset of the first set of message decoding data in the peripheral;
    whereby the controller and the device have shared knowledge for responding to the pointer portions and data portions, and the controller and the second source have shared knowledge for responding to the pointer portions and data portions, and the controller and the peripheral have shared knowledge for responding to the pointer portions and data portions.

14. The method of claim 13, wherein the second and third subsets are the same.

15. The method of claim 8, further comprising connecting the source of power to the network and sending multiple level messages from the controller to the source of power.

16. A welding-type system, comprising:
    a source of welding-type power;
    a network;
    a welding-type device;
    means for connecting the welding-type device to the network;
    a controller operatively connected to the source of welding-type power;
    means for connecting the controller to the network; and
    means for sending multiple level messages having an identifier portion and a data portion with a pointer portion and a value portion to the device from the controller.

17. The welding-type system of claim 16, further comprising, means for sending multiple level messages to the controller from the device.

18. The welding-type system of claim 16, further comprising:
    a welding peripheral operatively connected to the source of power;
    means for connecting the welding peripheral to the network; and
    means for sending multiple level messages to the peripheral from the controller.

19. The welding-type system of claim 16, further comprising a second source of welding connected in parallel to the source of welding.

20. The welding-type system of claim 19, further comprising:
    means for storing at least a first set of message decoding data in the controller;
    means for storing a first subset of the first set of message decoding data in the device; and
    means for storing a second subset of the first set of message decoding data in the peripheral;

whereby the controller and the device source have shared knowledge for responding to the pointer portions and data portions, and the controller and the peripheral have shared knowledge for responding to the pointer portions and data portions.

21. A method of providing welding-type power, comprising:

connecting a source of welding-type power to a controller;

connecting the controller to the network;

connecting a welding-type device to the network;

storing a first set of message decoding data in the controller; and storing at least a first subset of the first set of message decoding data in the device;

whereby the controller and the device have shared knowledge for responding to a pointer portion and a data portion of a plurality of messages.

22. The method of claim 21, further comprising sending multiple level messages between the device and the controller.

23. The method of claim 22, wherein sending includes sending multiple level messages with an identifier portion and a data portion, and wherein the data portion has a pointer portion and a value portion.

24. The method of claim 21, connecting includes connecting to a network that is DEVICENET™ compatible.

25. The method of claim 21, further comprising connecting a second source of welding-type power to the controller.

26. The method of claim 25, further comprising:

connecting a welding peripheral to the network; and storing at least a second subset of the first set of message decoding data in the peripheral, whereby the controller and the peripheral have shared knowledge for responding to the pointer portions and the data portions.

27. The method of claim 26, wherein the first and second subsets are the same.

28. A welding-type power supply, comprising:

a source of welding-type power;

a welding-type device;

a controller, operatively connected to the source; and a network, connected to the controller and connected to the device;

wherein the controller includes a controller memory, having a first set of message decoding data stored therein;

wherein the device includes a device memory, having at least a first subset of the first set of message decoding data stored therein;

whereby the controller and the device have shared knowledge for responding to a pointer portion and a data portion of a plurality of messages.

29. The welding-type power supply of claim 28, further comprising:

a controller multiple level message module on the controller, connected to the network and the controller memory; and a device multiple level message module on the source, connected to the network and the device memory.

30. The welding-type power supply of claim 29, wherein the network is DEVICENET™ compatible.

31. The welding-type power supply of claim 28, further comprising:

a second source of welding-type power connected to the network and connected to the first source; and a second source memory having at least a second subset of the first set of message decoding data stored therein, whereby the controller and the second source have shared knowledge for responding to the pointer portions and the data portions.

32. The welding-type power supply of claim 31, wherein the first and second subsets are not the same.

33. The welding-type power supply apparatus of claim 28, further comprising:

a welding peripheral connected the source and connected to the network; and a peripheral memory having at least a third subset of the first set of message decoding data stored therein, whereby the controller and the peripheral have shared knowledge for responding to the pointer portions and the data portions.

34. An apparatus for providing welding-type power, comprising:

means for connecting a source of welding-type power to a network;

means for connecting a controller to the source of welding-type power;

means for connecting the controller to the network;

means for storing a first set of message decoding data in the controller; and means for storing at least a first subset of the first set of message decoding data in the device;

whereby the controller and the device have shared knowledge for responding to a pointer portion and a data portion of a plurality of messages.

35. The apparatus method of claim 34, further comprising a second source of welding-type power connected to the controller.

36. The apparatus of claim 34, further comprising:

means for connecting a welding peripheral to the network; and means for storing at least a third subset of the first set of message decoding data in the peripheral, whereby the controller and the peripheral have shared knowledge for responding to the pointer portions and the data portions.

37. A method of communicating between devices in a weld cell comprising:

connecting a first device to a network;

connecting a second device to the network; and sending multiple level messages with an identifier portion and a data portion with a pointer portion and a value portion, between the first and second devices.

38. The method of claim 37, further comprising;

storing a first set of message decoding data in the first device;, and storing at least a first subset of the first set of message decoding data in the second device;

whereby the first and second device have shared knowledge for responding to the pointer portions and data portions.

39. A method of communicating between devices in a weld cell, comprising:

connecting a first device to a network;

connecting a second device to the network;

storing a first set of message decoding data in the first device;

storing at least a first subset of the first set of message decoding data in the second device; and whereby the first and second devices have shared knowledge for responding to a pointer portion and a data portion of a plurality of messages.

40. A system for communicating between devices in a weld cell, comprising:

a first device having a first network module with a first multiple level message module;

a second device having a second network module with a second multiple level message module; and a network, operatively connected to the first network module and the second network module, and capable of transmitting a plurality of multiple level messages having an identifier portion and a data portion with a pointer portion and a value portion.

41. A system for communicating between devices in a welding-type power supply, comprising:

a first device;

a second device; and a network, connected to the first and second devices;

wherein the first device includes a first memory, having a first set of message decoding data stored therein;

wherein the second device includes a second memory, having at least a first subset of the first set of message decoding data stored therein;

whereby the first and second device have shared knowledge for responding to a pointer portion and a data portion of a plurality of messages.

42. The system of claim 41, further comprising:

a first multiple level message module on the first device, connected to the network and the first memory; and a second multiple level message module on the second device, connected to the network and the first memory.

* * * * *